US006687317B1

(12) United States Patent
Koo

(10) Patent No.: US 6,687,317 B1
(45) Date of Patent: Feb. 3, 2004

(54) METHOD FOR CORRELATION DIRECTED ECHO CANCELLATION AND CHANNEL EQUALIZATION FOR THE DIGITAL TRANSMISSION LINK IN VESTIGIAL SIDE BAND AMPLITUDE MODULATION

(75) Inventor: David D. Koo, Carmel, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/521,170

(22) Filed: Mar. 8, 2000

Related U.S. Application Data

(60) Provisional application No. 60/129,830, filed on Apr. 16, 1999.

(51) Int. Cl.[7] ............................ H04L 25/03; H04L 7/06

(52) U.S. Cl. ........................................ 375/348; 375/346

(58) Field of Search ................................ 375/348, 355, 375/200, 206

(56) References Cited

U.S. PATENT DOCUMENTS 5,371,471 A 12/1994 Chennakeshu et al. ..... 329/304
5,687,198 A 11/1997 Sexton et al. ............... 375/347
6,014,407 A * 1/2000 Hunsinger et al. .......... 375/140
6,233,295 B1 * 5/2001 Wang ......................... 375/364
6,366,629 B1 * 4/2002 Chen et al. ................. 375/355

FOREIGN PATENT DOCUMENTS

EP 0425458 A1 5/1991 ........... H04L/25/03
EP 0 425 458 A1 * 5/1991 ........... H04L/25/03
WO 9844655 A2 10/1998 ........... H04B/7/005

OTHER PUBLICATIONS

"ATSC 8–VSB demodulator and decoder" Philips Data Sheet TDA 8960, Jun. 14, 1999.
"ATSC Digital Television Standard" Advanced Television Systems Committe, Doc. A/53. Apr. 12, 1995 Sep. 16, 1995.

* cited by examiner

*Primary Examiner*—Stephen Chin
*Assistant Examiner*—Lawrence Williams

(57) ABSTRACT

A method for determining and reducing or eliminating mid-range and long-rang echoes in the digital data transmission (in ATSC VSB system) is described. A portion of an ATSC VSB television signal is separated from the rest of the signal, certain values are set to zero and it is correlated with a first vector of data. The result of the correlation represents a channel model as affected by echoes within the channel, and then a second vector of data is added to it to derive correction information useful in positioning moveable filter taps to suppress the most prominent echoes.

4 Claims, 7 Drawing Sheets

RE-START
START
CORRELATION
KERNEL-1
RESET ACCUMULATOR
ADDITION AND ACCUMULATION
KERNEL-2
NO
IF MEET CONDITION?
CONDITIONAL ITERATION # = 8
YES
RE-START
CHANNEL MODEL GUIDANCE RESULT
CHANNEL MODEL GUIDANCE RESULT OUTPUT

KERNEL-1 DATA TIME DOMAIN WAVEFORM

METHOD FOR CORRELATION DIRECTED ECHO CANCELLATION AND CHANNEL EQUALIZATION FOR THE DIGITAL TRANSMISSION LINK IN VESTIGIAL SIDE BAND AMPLITUDE MODULATION

This application claims the benefit of provisional application No. 60/129,830 filed Apr. 16, 1999.

BACKGROUND OF THE INVENTION

In such high data rate AM digital transmissions, the intersymbol interference (ISI) caused by echoes occurring in the transmission path can sometimes be so high that the forward error correction codes (FEC) which are included within the transmitted digital data streams can no longer protect the integrity of the digital information. In the case of digital television, ISI causes a loss of FEC information which in turn results in a complete collapse of the channel and complete loss of the video and/or audio. As a result, TV broadcasters and manufacturers are justifiably concerned that the 8 VSB signals will not be robust enough to overcome the ISI (also known and alternatively referred to herein as "echoes" and "multipath interference") which will occur for example in a city environment where there are many tall buildings which can cause such interference. Some industry researchers have suggested that the 8 VSB modulation system has been shown under actual use conditions, to be particularly susceptible to echo interference. As a result, interested parties have suggested changing the modulation system to one which might arguably be more resistant to ISI.

Advocates of ATSC modulation approach argue that alternative methods of digital modulation do not demonstrate superior resistance to ISI. More importantly, many broadcasters have already invested money in building transmitter facilities for the 8 VSB digital transmission, and television receivers are already being designed, and sold, which are ATSC (8 VSB) compliant. Therefore, for practical reasons, the manufacturers of digital television receivers will have to find a solution to the ISI problem by improving the performance of 8 VSB receivers in the face of ISI. One way of doing this is through the use of improved channel equalization at the receiver.

Adaptive filters are well known in the art. The coefficients of such filters are adjusted in dependence upon the characteristics of the received signal. This filtering is also termed equalization, because it has the effect of reducing, or equalizing, the effects of those environmental sources which caused the observed errors. After the adjustment, or training, of the receiver, the processing of message symbols commences. The underlying assumption in this scenario is that the environmental conditions which caused detected differences in the received training symbols as compared to the transmitted training symbols, would affect the subsequent received message symbols as well, and, therefore, an adjustment to the filters which minimized errors in the received training symbols would also minimize errors in the received message symbols.

In order for a receiver to perform the necessary channel equalization to minimize or eliminate the ISI caused by echoes, the time domain processing technique of correlation can be used to locate the presence of echoes in time. Once the echoes are so located, an echo canceling digital filter or equalizer (EQ) having the necessary high performance to suppress the echoes may be designed with proper hardware and algorithms. But the performance and the hardware cost becomes a measure of efficiency. Generally the time range of the echo-spread can be very large, for example from about −3 microseconds to about +40 microseconds in terrestrial broadcasting/communications, and sometimes it can even have the range of from about −20 microseconds to about +60 microseconds and beyond, and therefore it is not, very practical or efficient to provide static multiplier branches (also called taps) in the EQ to cover all of the possible echo time positions.

Co-pending U.S. patent application Ser. No. 08/880,378 describes an example of an adaptive digital filter which features movable clustered taps. A number of taps are combined together to form a cluster in the equalizer and those clusters can be flexibly moved to any time/delay location to perform echo cancellation when needed. This type of movable cluster tap equalizer can greatly reduce or cancel the echoes on demand if the clusters can be positioned on the time axis precisely. The present application and the '378 application are owned by a common Assignee and the '378 application is specifically incorporated by reference herein. Details of about the ATSC signal structure can be found in the document "ATSC Digital Television Standard" (Doc. A/53) which is incorporated by reference herein.

SUMMARY OF THE INVENTION

Current methods for locating echoes in time have not demonstrated the necessary sensitivity to effectively deal with the presence of mid-range and long-range echoes. Without an effective way to locate all of the source of the echoes, equalization to mitigate ISI will be insufficient to adequately improve the performance of digital television receivers in high echo environments. The instant invention comprises an improved method for locating echoes present in a digital data transmission. The method and apparatus are especially effective for locating in time, mid-range and long-range echoes. The invention also comprises a novel correlation process to precisely find the cluster location information needed to effectively position adjustable taps of an adaptive filter in the time axis. In a preferred embodiment the invention comprises a method for substantially reducing, at a receiver, inter-symbol interference (ISI) caused by multipath in a digital television signal.

The ATSC signal is received at a digital television receiver containing a demodulator, an adaptive filter with moveable tap clusters and a decoder. The receiver separates from the ATSC signal a portion of the signal which is then correlated with a first vector of data samples (Kernel 1) as listed, for example, in Appendix A and shown graphically, for example, in FIG. 3, to obtain a correlated signal as shown graphically in FIG. 4. A second vector of data samples (Kernel 2), as listed for example, in Appendix B and shown graphically for example, in FIG. 5, is then added to the correlated signal to obtain a correction signal, as shown in FIG. 6, which provides information about multipath, for example, the location in time of detected echoes.

Using the echo location information provided by the correction signal, the moveable filter tap clusters of the EQ are positioned to the appropriate locations in time of the most significant echoes thereby compensating for the ISI interference caused by the echoes to achieve substantial echo reduction or elimination and preserving of the integrity of the data transmission.

DESCRIPTION OF PREFERRED EMBODIMENT OF THE INVENTION

The ATSC-VSB data stream as specified by the ATSC has two modes. The first mode designed for terrestrial broadcasting, modulates data onto an rf data carrier frequency signal using 8 levels to represent data symbols of 3 bits each. This is known as 8 VSB. A second mode is available for higher band width cable transmissions which modulates the information using 16 levels of 4 bits each (16 VSB). Although the invention is described herein in connection with the 8 VSB mode, it is equally applicable for use 16 VSB mode.

Figure 1:
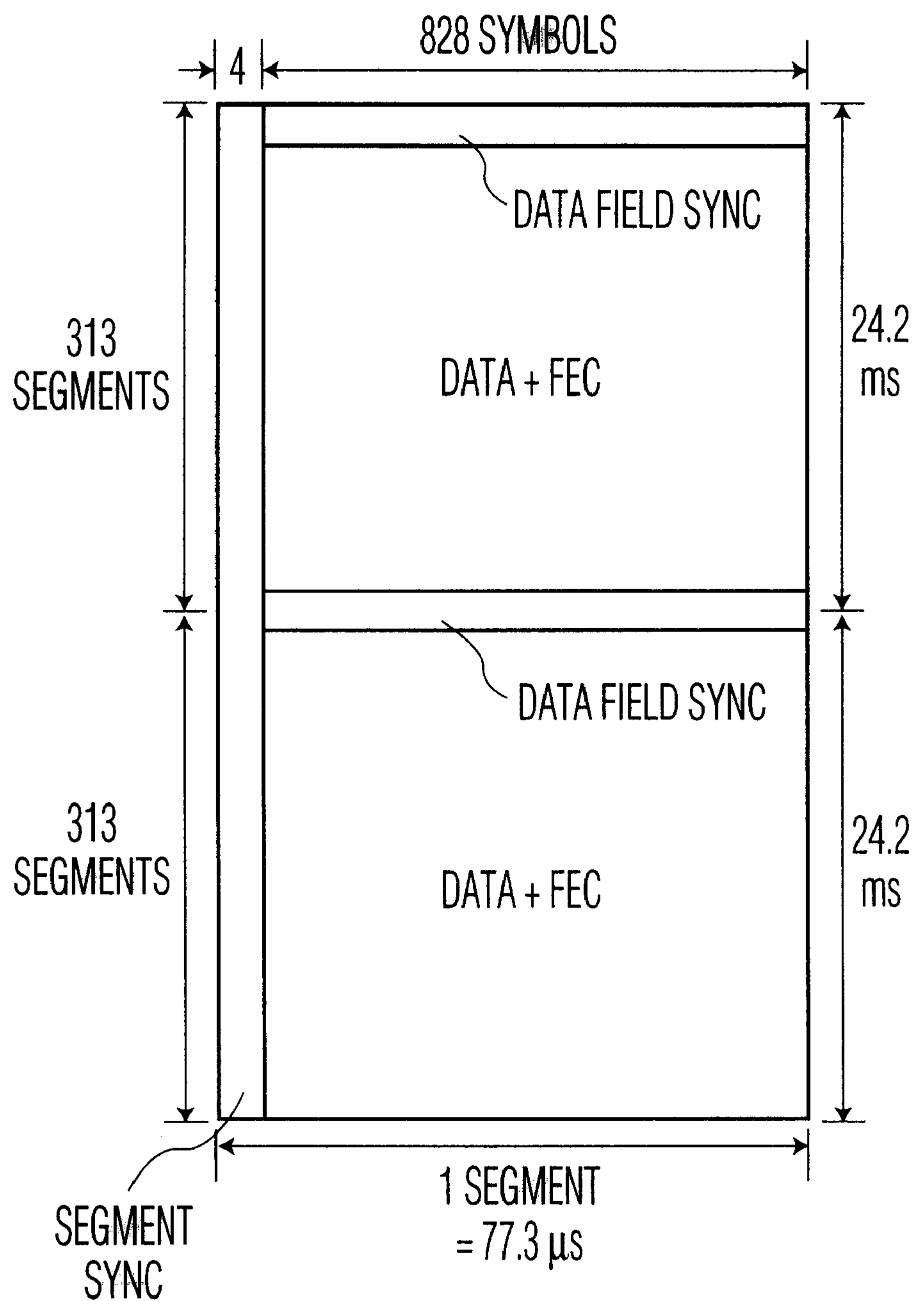
FIG. 1 illustrates a VSB data frame of the ATSC digital television signal.

As described in "ATSC Digital Television Standard" and described in FIG. 1, television data is transmitted as data frames. Each data frame begins with a first data field sync segment followed by three hundred and twelve data segments, and then a second data field sync segment followed by another 312 data segments. Each segment consists of four symbols of segment sync followed by 828 symbols of data. Each data field sync segment includes the training sequence used by the equalizer in the receiver.

Figure 7:
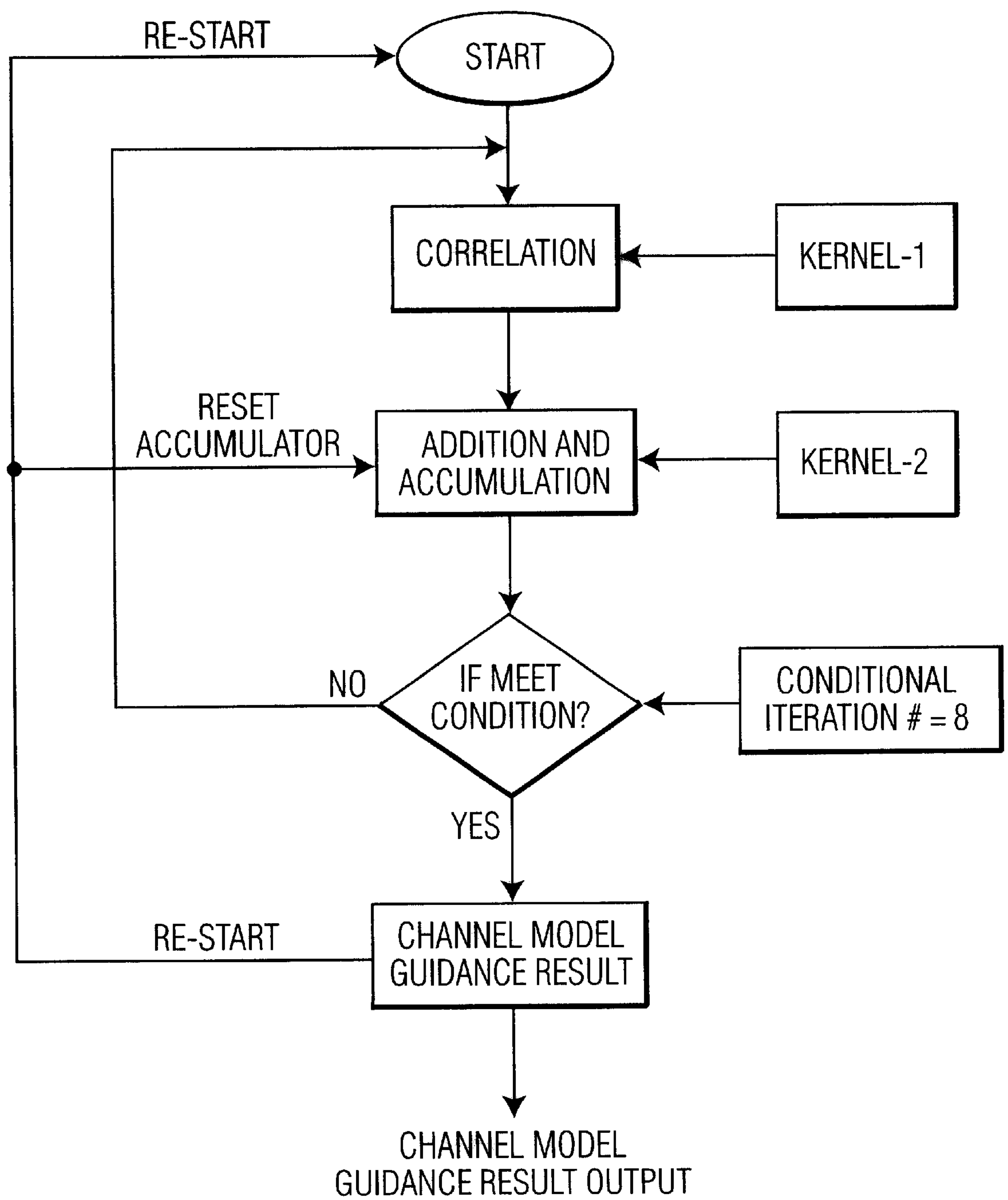
FIG. 7 is a flow chart describing the invention.

In accordance with the invention, an ATSC VSB receiver receives the ATSC signal and extracts and separates one or more data field sync segments. Integrated circuits are available which perform ATSC 8 VSB demodulation and decoding, for example the TDA 8960, sold by Philips Semiconductors Corp. These circuits include adaptive equalizers which are "trained" by the data field sync segments and contain the circuitry necessary to separate the data field sync segments so they can be processed in accordance with the invention as described below and in the flow chart provided in FIG.7.

Figure 2:
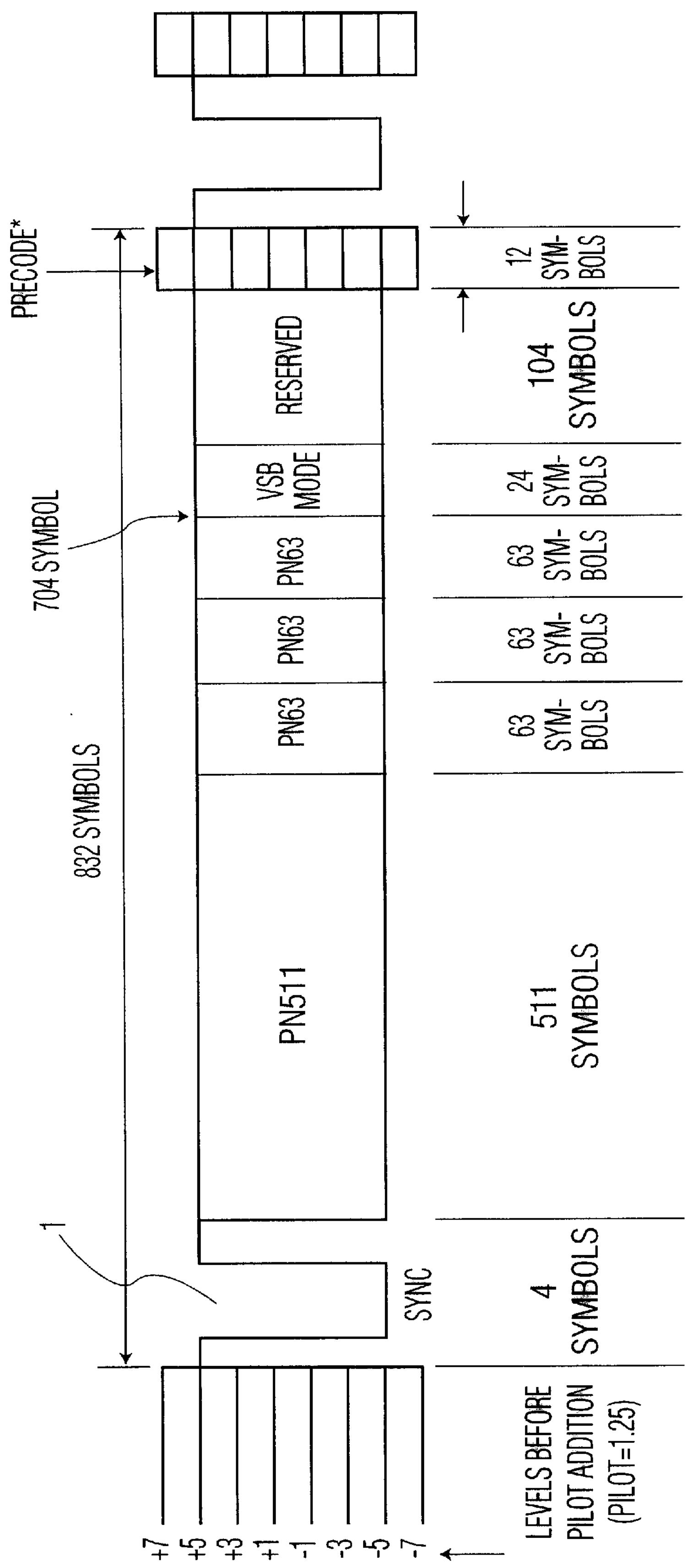
FIG. 2 illustrates a VSB data field sync segment of the VSB data frame.

FIG. 2 illustrates the structure of a data field sync segment. The data field sync segment is identified by the segment sync 1 which makes up the first four symbols of the 832 symbol data field sync segment. In accordance with the invention, the 116 symbols of data between the 704th symbol (the symbol after the third PN63 data sequence) and the 820th is then removed (set to the value of 0.0) converting the selected data field sync segment to a modified data field sync segment The programming skill and/or additional circuitry needed to perform this operation are readily known in the digital circuitry art and will not be elaborated on herein.

Figure 3:
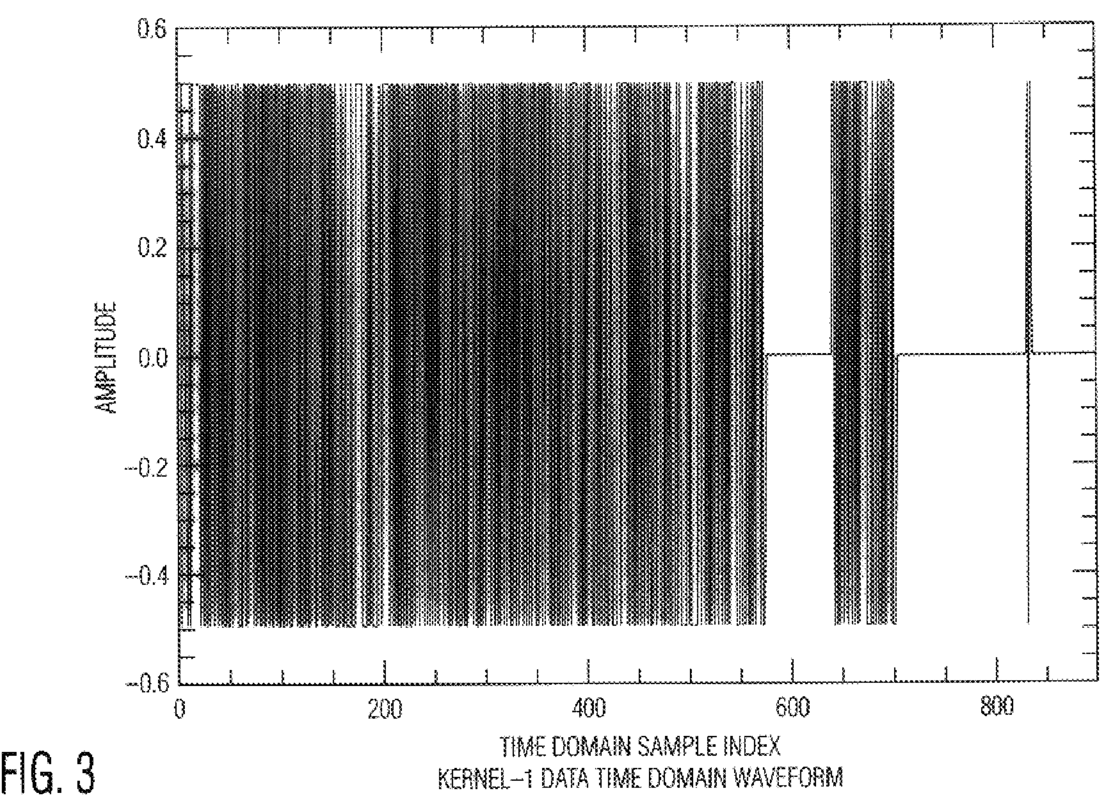
FIG. 3 illustrates graphically Kernel 1 in accordance with the invention.

After the removal of those 116 symbols, the information provided by the modified data field sync segment is correlated with a first vector of data, for example Kernel 1 as described in FIG. 3 and Appendix A. The programming skill and/or additional circuitry needed to perform this operation are readily known in the digital circuitry art and will not be elaborated on herein. The result of this correlation, referred to herein as first temporary result data (TRD1) and shown graphically in FIG. 4, provides an idealized channel model of the transmitted 8VSB signal.

Figure 4:
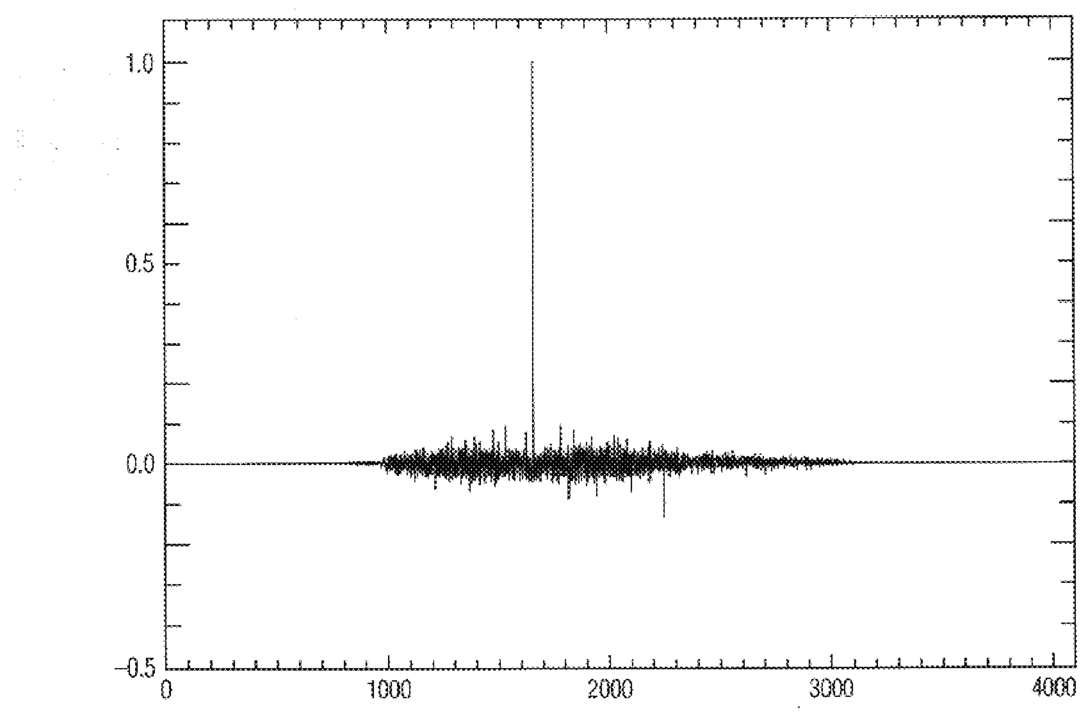
FIG. 4 illustrates graphically the result of correlating a portion of the received ATSC television signal with Kernel 1.
Figure 5:
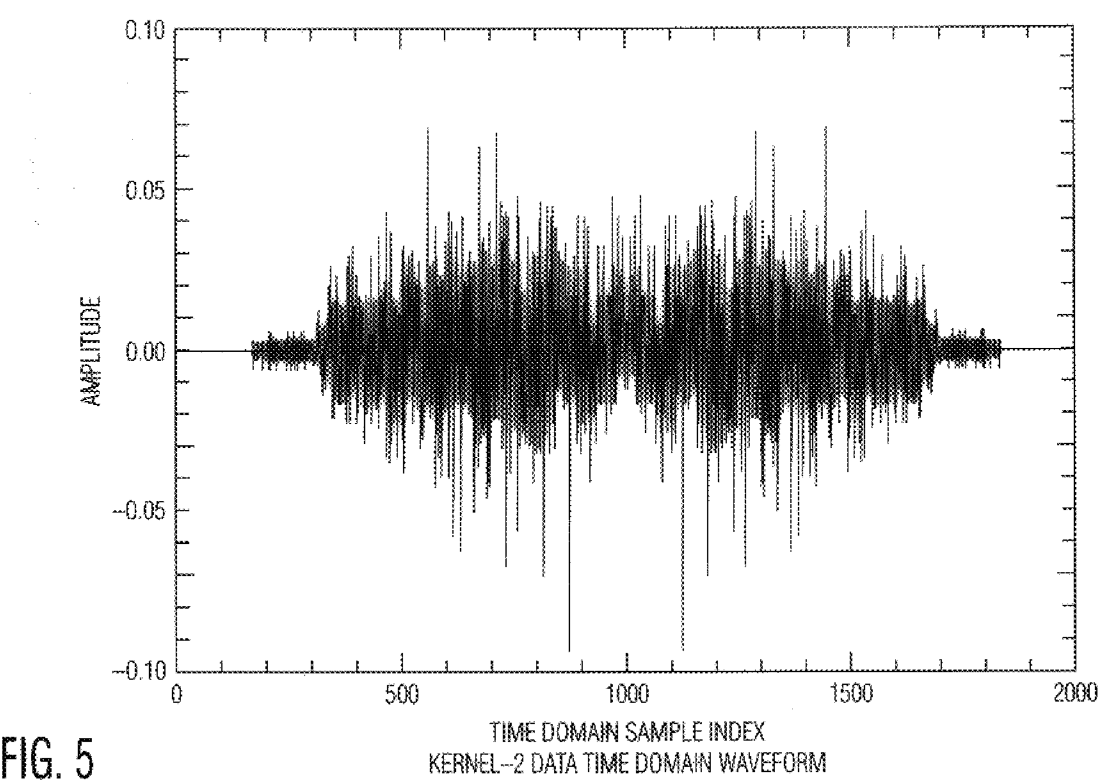
FIG. 5 illustrates graphically Kernel 2 in accordance with the invention.
Figure 6:
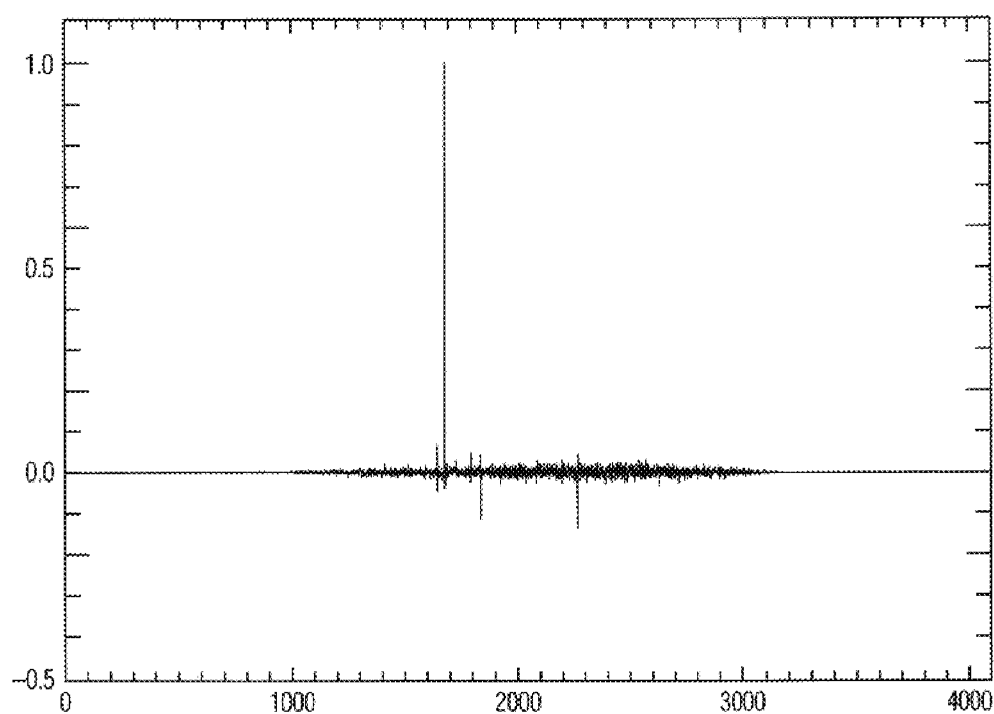
FIG. 6 illustrates graphically the result of adding the signal of FIG. 4 to Kernel 2.

Kernel 2 as described in Appendix B and shown graphically in FIG. 4, is then added to the TRD1, resulting second temporary result data (TRD2) as shown graphically in FIG. 5. The programming skill and/or additional circuitry needed to perform this operation are readily known in the digital circuitry art and will not be elaborated on herein.

The process of converting the data field sync segment into TRD1 (by correlation) and then converting TRD2 (by addition of Kernel 2 to TRD1 is an iterative one and after a number of N iterations (for example N may be 16), all of the data TRD2(0) . . . TRD2(i) TRD2(N−1) is added together and normalized to provide a multipath guidance information vector (MGIV) representing a channel model of the transmission path indicating the position in time of any substantial echoes. This MGIV is the final result information to be used to guide the positioning process for the movable clusters of the adaptive filter. The larger valued elements (except for the largest valued element) above a selected threshold and their corresponding position indexes represent the echo strengths and their unique timing positions, which leads to precision positioning for the clusters.

What is claimed is:

1. A method for adjusting an adaptive filter having one or more moveable filter taps to substantially reduce, in a receiver comprising said adaptive filter, inter-symbol interference in a digital data signal, comprising the steps of:

a) receiving said digital data signal;

b) separating from said digital data signal a training signal;

c) correlating said training signal with a predetermined first vector of data to obtain a correlated signal representing a channel model;

d) adding to said correlated signal, a second vector of predetermined data to obtain a correction signal; and e) using said correction signal to position in time, said one or more moveable filter taps of said adaptive filter.

2. The method of claim 1 wherein said training signal is a data field sync segment.

3. A method for adjusting an adaptive filter having one or more moveable filter taps to substantially reduce, in a receiver comprising said adaptive filter, echoes in a television signal, comprising the steps of:

f) receiving said television signal;

g) separating from said television signal a training signal;

h) correlating said training signal with a predetermined first vector of data to obtain a correlated signal representing a channel model;

i) adding to said correlated signal, a second vector of predetermined data to obtain a correction signal providing clustering information; and j) using the clustering information to position clusters of said movable filter taps to appropriate locations in time to compensate for one or more of said echoes.

4. The method of claim 3 wherein said television signal is an digitally modulated VSB signal.

* * * * *